Patented Dec. 20, 1938

2,140,569

UNITED STATES PATENT OFFICE 2,140,569

PRODUCTION OF ORGANIC SULPHUR COMPOUNDS

Hanns Ufer and Otto Hecht, Ludwigshafen-on-the-Rhine, Germany, assignors to I. G. Farbenindustrie Aktiengesellschaft, Frankfort-on-the-Main, Germany No Drawing. Application April 11, 1936, Serial No. 73,932. In Germany April 17, 1935

13 Claims. (Cl. 260—513)

The present invention relates to organic sulphur compounds and to a process of producing the same.

We have found that vinyl sulphides or vinyl sulphoxides of the general formulae $$R(S.CH{=}CH_2)_x$$

and $R(SO.CH{=}CH_2)_x$, in which R is an aliphatic, isocyclic or heterocyclic radicle and $x$ is a whole number, can be reacted with watersoluble bisulphites of light metals, such as sodium, potassium, calcium and magnesium. The bisulphite adds on to the vinyl sulphide or vinyl sulphoxide group with the formation of sulphonic acid salts. In order to render the reaction complete and to obtain good yields, the reaction components must be heated for a sufficiently long period or at a sufficiently high temperature. Heating at from about 70° to 130° for several hours is usually sufficient.

For the reaction it is possible to employ vinyl sulphides and vinyl sulphoxides of the formulae $R(S.CH{=}CH_2)$ and $R(SO.CH{=}CH_2)$ in which R is an alkyl or alkenyl group, as for example an ethyl, propyl, butyl, hexyl, dodecyl, octodecyl or octodecenyl group, the radicle of an isocyclic compound, as for example a phenyl, naphthyl, benzyl, phenyl-ethyl, cyclohexyl or tetrahydronaphthyl residue, or the radicle of a heterocyclic compound, as for example of pyridine, quinoline, benzothiazole or benzimidazole. The said vinyl sulphides or vinyl sulphoxides may also contain the $S.CH_2-$ or $SO.CH_2-$ groups two or more times, and may then react a corresponding number of times. They may also contain other atoms or atomic groups, as for example halogen atoms or hydroxyl, alkyl, alkoxy, hydroxyalkyl, nitro, amino, sulph-hydryl, carboxylic or sulphonic acid groups.

The reaction is preferably carried out in the presence of solvents or diluents, such as water or aqueous alcohols, if desired under pressure.

The compounds obtained may be employed for example for the manufacture of dyestuffs or, when employing suitable initial materials, as dyestuffs themselves, and also as assistants in the textile and related industries.

By further oxidation, the sulphides or sulphoxides containing sulphonic acid groups thus obtained may be converted into the corresponding sulphones, or the sulphoxides may be converted by means of reducing agents into the corresponding sulphides.

The following examples will further illustrate how the said invention may be carried out in practice but the invention is not restricted to these examples. The parts are by weight.

Example 1

47 parts of vinyl para-tolyl sulphoxide and 200 parts of a from 38 to 40 per cent solution of sodium bisulphite are heated for about four hours at about 100° C. under reflux while stirring continuously or periodically. The sulphoxide, originally floating on the aqueous layer, gradually passes into solution. After cooling, the crystal pulp formed is separated from the mother liquor and washed with ether to remove unchanged initial material.

The reaction product is obtained in the form of colorless crystals which dissolve readily in water and may be recrystallized from alcohol.

The corresponding addition products may be obtained in a similar manner from other isocyclic or heterocyclic vinyl sulphoxides.

Example 2

100 parts of octodecyl vinyl sulphoxide and 250 parts of an about 40 per cent solution of sodium bisulphite are heated for about four hours at about 100° C. under reflux. The sulphoxide passes into solution rather rapidly. After cooling, the resulting crystal pulp is separated from the mother liquor and treated with ether for the removal of small amounts of unchanged initial material. The resulting addition product may be further purified by crystallization from alcohol. It forms colorless crystals, comparatively readily soluble in warm water, and has a strong emulsifying power, for example for aromatic hydrocarbons.

If other aliphatic vinyl sulphoxides, as for example octyl, dodecyl or octodecenyl vinyl sulphoxides, be employed instead of octodecyl vinyl sulphoxide, the corresponding addition compounds are obtained in a similar manner.

When employing potassium or calcium bisulphite instead of sodium bisulphite the potassium or calcium salts of the said sulphide or sulphoxide ethane sulphonic acids are obtained.

Example 3

100 parts of octodecyl vinyl sulphide (having a melting point of from 33° to 34° C.) and 240 parts of an about 42 per cent solution of sodium bisulphite are heated for eight hours at about 100° C. under reflux while stirring. After cooling, the resulting crystal pulp is filtered off by suction and washed with ether for the removal of unchanged initial material. The product treated with ether may be recrystallized from alcohol for the purpose of further purification. The new compound is difficultly soluble in cold water.

Example 4

25 parts of vinyl para-tolyl sulphide (boiling point from 91° to 93° C. at from 9 to 10 millimetres (mercury gauge)) and 105 parts of an about 40 per cent solution of sodium bisulphite are heated for ten hours at about 100° C. under reflux while stirring continuously.

The solid product deposited after cooling is filtered off by suction and washed with acetone to remove unchanged initial material. The product thus obtained is soluble in water and decomposes when heated above 165° C. and thereby becomes brown.

The yield may be increased by heating the components at a higher temperature while employing increased pressure.

Example 5

A mixture of 40 parts of 1,12-octodecane divinyl disulphoxide of about 90 per cent strength (obtained from ricinoleic acid by way of the intermediate stages of 1,12-octodecane diol, 1,12-octodecane dibromide, 1,12-octodecane dithiol, 1,12-octodecane divinyl disulphide) and 120 parts of 40 per cent solution of sodium bisulphite is stirred for 5 hours at from about 90° to 100° C. under reflux. After cooling the undissolved portion is separated off from the aqueous solution and freed from unchanged starting material by treating with acetone and alcohol and washing with warm methanol. The addition compound thus obtained is a pale yellow, solid product which is soluble in water like soap, but scarcely soluble in alcohol.

Example 6

150 parts of a saturated aqueous solution of sodium bisulphite are added to 54 parts of dodecyl vinyl sulphoxide and the mixture is heated for seven and a half hours at about 95° C. To the reaction mixture there are added 36,4 parts of sodium bicarbonate and a little water. By extracting the dried crude product with boiling alcohol, white crystals are obtained which decompose at from 205° to 210° C. without melting. They are readily soluble in water and possess a high foaming power and soap-like character.

Example 7

137 parts of a 34.5 per cent aqueous suspension of a mixture of vinyl sulphoxides of high molecular weight, obtained from the mixture of sperm oil fatty acids by way of the intermediate stages of the corresponding alcohols, mercaptans and vinyl sulphides, are heated for seven hours with 109 parts of a 42 per cent sodium bisulphite solution at from about 80° to 95° C. under reflux cooling. The aqueous solution obtained having an acid reaction is adjusted to a pH-value of 7.4 by the addition of 20 parts of sodium bicarbonate. The reaction product obtained possesses a soap-like character.

What we claim is:

1. The process of producing organic sulphur compounds which comprises reacting sulphur compounds otherwise stable under the reaction conditions obtaining and having the general formula $$R(YCH=CH_2)_x$$

in which R is a member selected from the group consisting of radicals of aliphatic, cycloaliphatic, aliphatic-aromatic and aromatic hydrocarbons and their halogen-, hydroxyl, alkoxy, hydroxyalkyl, nitro, amino, sulphhydryl, carboxylic and sulphonic acid substitution products, x is a whole number up to 2 and Y stands for a member selected from the group consisting of S and SO with bisulphites of metals selected from the group consisting of sodium, potassium and calcium.

2. The process of producing organic sulphur compounds which comprises reacting sulphur compounds otherwise stable under the reaction conditions obtaining and having the general formula $$R(YCH=CH_2)_x$$

in which R is a member selected from the group consisting of radicals of aliphatic, cycloaliphatic, aliphatic-aromatic and aromatic hydrocarbons and their halogen-, hydroxyl, alkoxy, hydroxyalkyl, nitro, amino, sulphhydryl, carboxylic and sulphonic acid substitution products, x is a whole number up to 2 and Y stands for a member selected from the group consisting of S and SO with bisulphites of light metals selected from the group consisting of sodium, potassium and calcium in the presence of inert diluents.

3. The process of producing organic sulphur compounds which comprises reacting sulphur compounds otherwise stable under the reaction conditions obtaining and having the general formula $$R(YCH=CH_2)_x$$

in which R is a member selected from the group consisting of radicals of aliphatic, cycloaliphatic, aliphatic-aromatic and aromatic hydrocarbons and their halogen-, hydroxyl, alkoxy, hydroxyalkyl, nitro, amino, sulphhydryl, carboxylic and sulphonic acid substitution products, x is a whole number up to 2 and Y stands for a member selected from the group consisting of S and SO with bisulphites of light metals selected from the class consisting of sodium, potassium and calcium in the presence of water.

4. The process of producing organic sulphur compounds which comprises heating sulphur compounds otherwise stable under the reaction conditions obtaining and having the general formula $$R(YCH=CH_2)_x$$

in which R is a member selected from the group consisting of radicals of aliphatic, cycloaliphatic, aliphatic-aromatic and aromatic hydrocarbons and their halogen-, hydroxyl, alkoxy, hydroxyalkyl, nitro, amino, sulphhydryl, carboxylic and sulphonic acid substitution products, x is a whole number up to 2 and Y stands for a member selected from the group consisting of S and SO with bisulphites of light metals selected from the class consisting of sodium, potassium and calcium at from 70° to 130° C.

5. The process of producing organic sulphur compounds which comprises reacting a vinyl sulphoxide of the general formula $$R(SO.CH=CH_2)_x$$

in which R is an aliphatic radicle containing at least 6 carbon atoms and x is a whole number up to 2 with bisulphites of light metals selected from the class consisting of sodium, potassium and calcium.

6. The process of producing organic sulphur compounds which comprises reacting dodecyl vinyl sulphoxide with sodium bisulphite.

7. The process of producing organic sulphur compounds which comprises reacting octodecyl vinyl sulphoxide with sodium bisulphite.

8. The process of producing organic sulphur compounds which comprises reacting octodecenyl vinyl sulphoxide with sodium bisulphite.

9. Stable sulphoxide-ethyl-sulphonic acid salts having the general formula $$R(SO.CH_2\!-\!CH_2.SO_3Me)_x$$

in which R is a member selected from the group consisting of radicles of aliphatic, cycloaliphatic, aliphatic-aromatic and aromatic hydrocarbons and their halogen-, hydroxyl, alkoxy, hydroxyalkyl, nitro, amino, sulphhydryl, carboxylic and sulphonic acid substitution products, Me is a metal selected from the group consisting of sodium, potassium and calcium and $x$ is a whole number up to 2.

10. Sulphoxide-ethyl-sulphonic acid salts having the general formula $$R(SO.CH_2\!-\!CH_2.SO_3Me)_x$$

in which R is an aliphatic radicle containing at least 6 carbon atoms, Me is a metal selected from the group consisting of sodium, potassium and calcium and $x$ is a whole number up to 2.

11. Dodecyl - sulphoxide - ethyl - sulphonic acid sodium salt.

12. Octodecyl-sulphoxide-ethyl-sulphonic acid sodium salt.

13. Octodecenyl -sulphoxide - ethyl - sulphonic acid sodium salt.

HANNS UFER.
OTTO HECHT.